US011222739B2

United States Patent
Kotani et al.

(10) Patent No.: US 11,222,739 B2
(45) Date of Patent: Jan. 11, 2022

(54) FERRITE MATERIAL, COMPOSITE MAGNETIC BODY, COIL COMPONENT, AND POWER SUPPLY DEVICE

(71) Applicant: Panasonic Intellectual Property Management Co., Ltd., Osaka (JP)

(72) Inventors: Junichi Kotani, Hyogo (JP); Nobuya Matsutani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 16/082,159

(22) PCT Filed: Mar. 7, 2017

(86) PCT No.: PCT/JP2017/008890
§ 371 (c)(1),
(2) Date: Sep. 4, 2018

(87) PCT Pub. No.: WO2017/154864
PCT Pub. Date: Sep. 14, 2017

(65) Prior Publication Data
US 2019/0066892 A1    Feb. 28, 2019

(30) Foreign Application Priority Data

Mar. 10, 2016    (JP) .............................. JP2016-047677

(51) Int. Cl.
*H01F 1/34*    (2006.01)
*C01G 49/00*    (2006.01)
(Continued)

(52) U.S. Cl.
CPC ............. *H01F 1/344* (2013.01); *C01G 49/00* (2013.01); *H01F 1/34* (2013.01); *H01F 27/28* (2013.01); *H01F 27/24* (2013.01)

(58) Field of Classification Search
CPC ........................... H01F 1/344; C01G 49/0072
See application file for complete search history.

(56) References Cited

U.S. PATENT DOCUMENTS

| | | |
|---|---|---|
| 2005/0072955 A1 | 4/2005 | Takahashi et al. |
| 2010/0239879 A1 | 9/2010 | Kawano et al. |
| 2012/0007013 A1 | 1/2012 | Takahashi et al. |

FOREIGN PATENT DOCUMENTS

| | | |
|---|---|---|
| CN | 1121191 | 4/1996 |
| CN | 1637962 | 7/2005 |

(Continued)

OTHER PUBLICATIONS

Hashizume. Reduction Of MnFe2O4 Without and With Carbon. Journal of Thermal Analysis and Calorimetry, vol. 69 (2002) 1045-1050 (Year: 2002).*

(Continued)

*Primary Examiner* — Matthew E. Hoban
(74) *Attorney, Agent, or Firm* — Wenderoth, Lind & Ponack L.L.P.

(57) ABSTRACT

Provided are a ferrite material, a composite magnetic body, a coil component, and a power supply device, having high magnetic permeability. Ferrite is ferromagnetic and is expressed by a chemical formula $Mn_xSi_yFe_zO_{4-\delta}$, where $0<x<1$, $y>0$, $z>0$, $x+y+z=3$, and $\delta \leq 0.5$.

18 Claims, 3 Drawing Sheets

(51) Int. Cl.
*H01F 27/28* (2006.01)
*H01F 27/24* (2006.01)

(56) References Cited

FOREIGN PATENT DOCUMENTS

| EP | 0 689 102 | | 12/1995 |
|----|-----------|---|---------|
| JP | 58-91038 | | 5/1983 |
| JP | 6-267723 | | 9/1994 |
| JP | 2009-3026 | | 1/2009 |
| WO | WO2002080202 | * | 3/2001 |
| WO | 02/080202 | | 10/2002 |
| WO | 2009/078453 | | 6/2009 |
| WO | 2010/109850 | | 9/2010 |

OTHER PUBLICATIONS

Yamamura. Human Translation of S58091038A. May 30, 1983. Chuo Denki Kogyo.*
International Search Report (ISR) dated May 23, 2017 in International (PCT) Application No. PCT/JP2017/008890.
Office Action dated Sep. 9, 2020, in corresponding Chinese Patent Application No. 201780015336.7, with English translation of the Search Report.

* cited by examiner

| SAMPLES | | | (a) | (b) | (c) | (d) | (e) |
|---|---|---|---|---|---|---|---|
| COMPOSITIONAL RATIOS | | x | 0 | 1 | 1 | 1 | 1 |
| | | y | 1 | 0.25 | 0.5 | 0.75 | 0 |
| | | z | 2 | 1.75 | 1.5 | 1.25 | 2 |
| PROCESS | WEIGHING (MASS (g)) | MnO | — | 5.1 | 5.9 | 7.1 | 4.4 |
| | | $SiO_2$ | 3.8 | 1.1 | 2.5 | 4.5 | — |
| | | $Fe_2O_3$ | 10 | 10 | 10 | 10 | 10 |
| | MIXING | | ADD PURE WATER AND PERFORM MIXED DISPERSION USING ROTATING BALL MILL | | | | |
| | CALCINATION | TEMPERATURE (°C) | 900-1100 | | | | |
| | | ATMOSPHERE | REDUCTION | INERT | | | |

FIG. 3
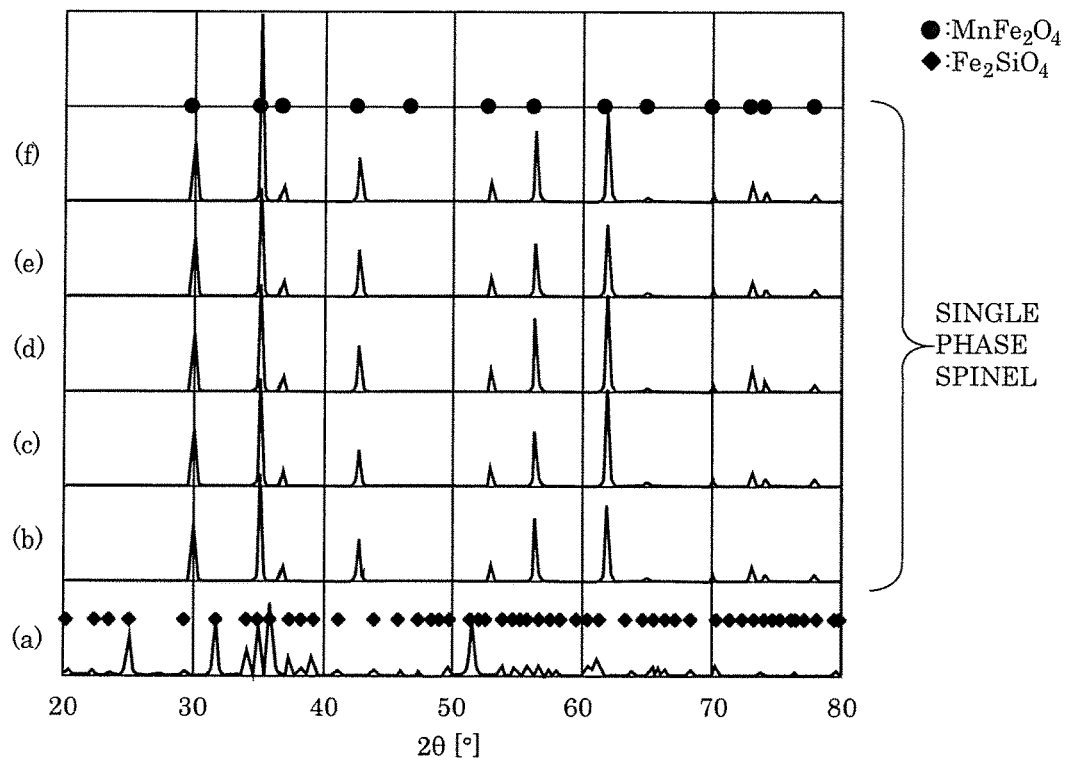
FIG. 4
| SAMPLES | x | y | z | MASS MAGNETIZATION (emu/g) |
|---|---|---|---|---|
| (a) | 0 | 1 | 2 | 0.5 |
| (b) | 1 | 0.25 | 1.75 | 66 |
| (c) | 1 | 0.5 | 1.5 | 55 |
| (d) | 1 | 0.75 | 1.25 | 44 |
| (e) | 1 | 0 | 2 | 78 |
| (f) | 0.75 | 0.25 | 2 | 79 |
FIG. 5
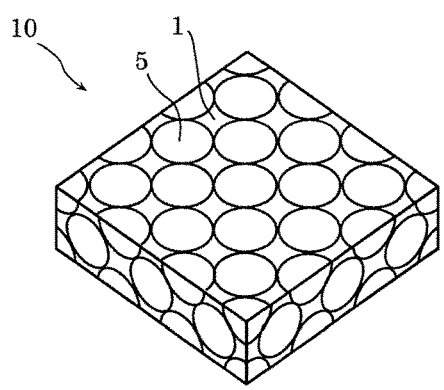

FERRITE MATERIAL, COMPOSITE MAGNETIC BODY, COIL COMPONENT, AND POWER SUPPLY DEVICE

TECHNICAL FIELD

The present disclosure relates to a ferrite material, a composite magnetic body, a coil component, and a power supply device.

BACKGROUND ART

Conventionally, an oxide magnetic material such as ferrite is used as a magnetic material for the magnetic cores of motors and transformers. A dust core produced by pressure molding iron powder, for example, can be subjected to metallic molding, and thereby has a high degree of flexibility in the shape of products. Additionally, even a dust core having a complicated shape can be manufactured in a simple and easy process with high accuracy. For these reasons, the usefulness of the dust core has drawn attention (see, for example, PTL 1).

PTL 1 discloses iron powder for dust cores. The iron powder for dust cores disclosed in PTL 1 is iron powder produced by coating the surface of iron powder with an oxide film composed of silicon oxide and an insulating layer composed of silicon resin. By mixing such iron powder for dust cores with adhesive resin and pressure molding the mixture, a dust core with high resistivity and less iron loss is generated without causing reduction in the mechanical strength of the dust core.

CITATION LIST

Patent Literature

PTL 1: WO Publication No. 2009/078453

SUMMARY OF THE INVENTION

Technical Problem

In the above-mentioned dust core, however, the oxide film and the insulating layer are formed around the iron powder. The oxide film used here is, for example, $Fe_2SiO_4$ which is a nonmagnetic material, the insulating layer is, for example, silicon resin which is a nonmagnetic material, and the adhesive resin is a nonmagnetic material. Accordingly, the nonmagnetic materials exist among the iron powder in a pressure-molded dust core. The problem therefore is that even in the case where the magnetic permeability of iron powder for dust cores alone is high, the magnetic permeability of a dust core as a whole is low.

In view of the above-described problem, the present disclosure has an object to provide a ferrite material and a composite magnetic body having high magnetic permeability.

Solutions to Problem

A ferrite material according to one aspect of the present disclosure is ferromagnetic and is expressed by a chemical formula $Mn_xSi_yFe_zO_{4-\delta}$, where $0<x<1$, $y>0$, $z>0$, $x+y+z=3$, and $\delta \leq 0.5$.

Moreover, a composite magnetic body according to one aspect of the present disclosure includes the ferrite material having the above-described characteristics, and metallic powder.

Moreover, a coil component according to one aspect of the present disclosure includes the composite magnetic body having the above-described characteristics.

Moreover, a power supply device according to one aspect of the present disclosure includes the coil component having the above-described characteristics.

Advantageous Effect of Invention

According to the present disclosure, it is possible to provide a ferrite material and a composite magnetic body having high magnetic permeability.

BRIEF DESCRIPTION OF DRAWINGS

FIG. 3 is a diagram illustrating the x-ray diffraction patterns of the ferrites shown in the examples of the ferrite according to Embodiment 1;

FIG. 4 is a diagram illustrating the ferromagnetic properties of the ferrites shown in the examples of the ferrite according to Embodiment 1;

FIG. 5 is a schematic diagram illustrating an example of the configuration of a composite magnetic body according to Embodiment 2.

DESCRIPTION OF EXEMPLARY EMBODIMENTS

Figures 1, 2:
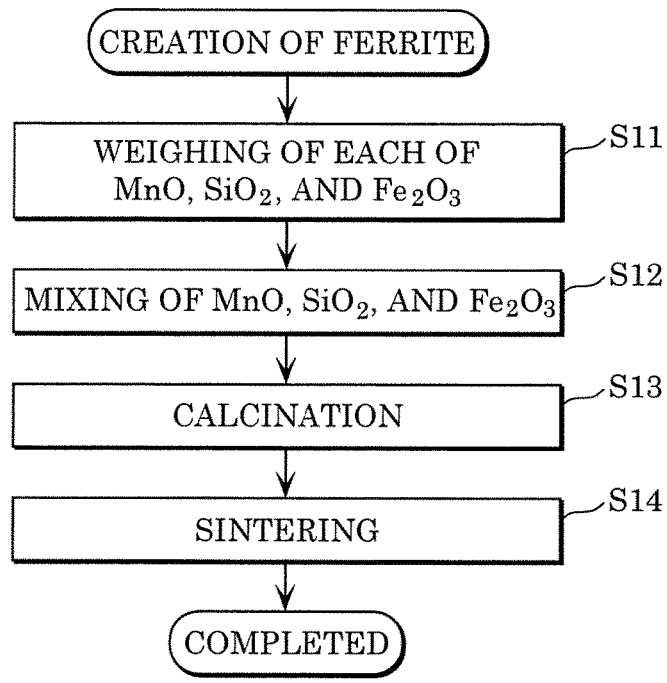
FIG. 1 is a flowchart illustrating a process of manufacturing ferrite according to Embodiment 1.
FIG. 2 is a diagram illustrating the conditions under which each process of manufacturing the ferrite according to Embodiment 1 is carried out.

The following describes exemplary embodiments with reference to the drawings.

Note that each of the embodiments described below is merely one specific example of the present disclosure. The numerical values, shapes, materials, elements, arrangement and connection of the elements, etc., indicated in the following embodiments are given merely by way of illustrations and are not intended to limit the scope of the present disclosure. Moreover, among the elements in the following embodiments, those not recited in any one of the independent claims defining the broadest concepts of the present disclosure are described as optional elements.

Embodiment 1

1. Configuration of Ferrite $Mn_xSi_yFe_zO_{4-\delta}$

The ferrite material according to this embodiment is an oxide including Fe, Si, and Mn, and is expressed by a chemical formula $Mn_xSi_yFe_zO_{4-\delta}$.

Spinel ferrite is generally expressed by $AB_2O_4$ (A and B can be any metallic elements). Ferrite $Fe_2SiO_4$ that has conventionally been used normally has an olivine structure, but is a nonmagnetic material having a spinel structure, under high pressure environment, in which Si ions are placed in A-site and Fe ions are placed in B-site.

In contrast, the ferrite $Mn_xSi_yFe_zO_{4-\delta}$ according to this embodiment is obtained by adding Mn ions to $Fe_2SiO_4$, and has a structure in which Mn ions are placed in the A-site while Si ions and Fe ions are placed in the B-site. The ferrite $Mn_xSi_yFe_zO_{4-\delta}$ has a spinel structure, and, with Mn being added thereto, turns into a ferromagnetic material that is ferromagnetic, which is different from the ferrite $Fe_2SiO_4$. The ferrite $Mn_xSi_yFe_zO_{4-\delta}$ is ferrite having a new composition that exhibits ferromagnetism.

Note that in the chemical formula $Mn_xSi_yFe_zO_{4-\delta}$, each of x, y, z, and δ satisfies $0<x<1$, $y>0$, $z>0$, $x+y+z=3$, and $\delta \leq 0.5$.

Here, a mechanism in which $Mn_xSi_yFe_zO_{4-\delta}$ exhibits ferromagnetism will be described starting from the explanation of a spinel structure. The spinel structure is a structure expressed by a general formula $AB_2O_4$.

In the ferrite $Fe_2SiO_4$ having a spinel structure, assuming that Si ions are placed in the A-site and Fe ions are placed in the B-site, an exchange action works, in the ferrite $Fe_2SiO_4$, to cause the magnetic moments of Fe ions to face antiparallel directions. For this reason, in the ferrite $Fe_2SiO_4$, the magnetic moments in antiparallel directions negate each other and magnetization does not appear as a whole. As a result, the ferrite $Fe_2SiO_4$ exhibits nonmagnetism.

In contrast, in the ferrite $Mn_xSi_yFe_zO_{4-\delta}$ obtained by adding Mn ions to ferrite $Fe_2SiO_4$, assuming that Mn ions are placed in the A-site while Si ions and Fe ions are placed in the B-site, a difference in size is produced between the magnetic moment of the Mn ions and the magnetic moment of the Fe ions. Because of this difference in the magnetic moments, magnetization appears as a whole in the ferrite $Mn_xSi_yFe_zO_{4-\delta}$. The ferrite $Mn_xSi_yFe_zO_{4-\delta}$ exhibits ferromagnetism by such a mechanism.

2. Method of Manufacturing Ferrite $Mn_xSi_yFe_zO_{4-\delta}$

The following describes the method of manufacturing the ferrite $Mn_xSi_yFe_zO_{4-\delta}$ according to this embodiment. FIG. 1 is a flowchart illustrating a process of manufacturing the ferrite $Mn_xSi_yFe_zO_{4-\delta}$ according to this embodiment.

The method of manufacturing the ferrite $Mn_xSi_yFe_zO_{4-\delta}$ according to this embodiment is a solid phase method using materials to be mentioned later on.

The solid phase method is referred to as a material manufacturing method of weighing predetermined amounts of plural kinds of raw powder that are the starting materials of the ferrite $Mn_xSi_yFe_zO_{4-\delta}$, mixing these materials, and subsequently synthesizing a target substance through firing after calcination. It should be noted that the solid phase method is also referred to as a solid reaction method. In this embodiment, MnO, $SiO_2$, and $Fe_2O_3$ are used as the starting materials of the ferrite $Mn_xSi_yFe_zO_{4-\delta}$.

The detailed manufacturing method is as follows.

As illustrated in FIG. 1, MnO, $SiO_2$, and $Fe_2O_3$ are each weighed (Step S11). The mass of MnO, $SiO_2$, and $Fe_2O_3$ are, for example, 5.1 (g) for MnO, 1.1 (g) for $SiO_2$, and 10 (g) for $Fe_2O_3$. Note that the mass and mixing ratio of MnO, $SiO_2$, and $Fe_2O_3$ will be described in detail in the examples to be described later.

Next, MnO, $SiO_2$, and $Fe_2O_3$ that have been weighed are mixed (Step S12). The mixing of MnO, $SiO_2$, and $Fe_2O_3$ is carried out by putting MnO, $SiO_2$, and $Fe_2O_3$ that have been weighed into a container, adding pure water, and performing mixed dispersion using a rotating ball mill. Note that the method of mixing MnO, $SiO_2$, and $Fe_2O_3$ shall not be limited to the mixed dispersion using a rotating ball mill, and a different mixing method may be used instead.

Next, MnO, $SiO_2$, and $Fe_2O_3$ that have been subjected to mixed dispersion are calcined (Step S13). More specifically, MnO, $SiO_2$, and $Fe_2O_3$ on which mixed dispersion has been performed are firstly put into a metallic mold and compressed, and a molded body is thus produced. Here, uniaxial molding is carried out with a constant pressure of 98 (MPa), for example. After that, the calcination of the molded body is conducted with the temperature of 900 to 1100 (° C.) for two hours in the atmosphere of inert gas such as nitrogen gas.

Through the above-described processes, the powder of the ferrite $Mn_xSi_yFe_zO_{4-\delta}$ having a composition in which a part of the ferrite $Fe_2SiO_4$ is replaced by Mn can be gained.

After that, the powder of the ferrite $Mn_xSi_yFe_zO_{4-\delta}$ is sintered (Step S14). Note that after having carried out again the uniaxial metallic molding of the calcined powder, atmospheric heating under normal pressure is performed or a hot press method is used for the sintering. Here, the hot press method is a method of putting powder or a pre-molded raw material into a mold and subsequently pressure sintering it while heating it with a high temperature. In the hot press method, a compact sintered body having density close to theoretical density can be gained and the micro-structure of a sintered body can be controlled. Therefore, it is possible to form a sintered body having excellent mechanical and physiological nature, such as a high-strength sintered body. Furthermore, such a sintered body is characterized in that it improves an interface contact between materials of different kinds and is capable of combining crystals or materials of different kinds, for example. The sintering method shall not be limited to these methods, and a different method that enables sintering of $Mn_xSi_yFe_zO_{4-\delta}$ powder may be used instead.

By changing the values of x, y, and z of the ferrite $Mn_xSi_yFe_zO_{4-\delta}$, the molding of the powder of ferrite $Mn_xSi_yFe_zO_{4-\delta}$ of plural kinds was carried out using the above-described manufacturing method. The following examples show the combinations of the values of x, y, and z. Moreover, crystal structure and magnetic properties of the sintered and synthesized ferrite $Mn_xSi_yFe_zO_{4-\delta}$ powder were evaluated.

3-1. EXAMPLES

Next, the examples will be described. FIG. 2 is a diagram illustrating the conditions under which each process of manufacturing the ferrite $Mn_xSi_yFe_zO_{4-\delta}$ according to this embodiment is carried out.

As illustrated in FIG. 2, ferrites $Mn_xSi_yFe_zO_{4-\delta}$ of different compositional ratios of x, y, and z in $Mn_xSi_yFe_zO_{4-\delta}$ were created using the above-described manufacturing method. Note that each of the compositional ratio of y and z is changed by 0.25 between the examples.

Example 1

The ferrite $Mn_xSi_yFe_zO_{4-\delta}$ shown in sample (b) in FIG. 2 was created as example 1. In sample (b), the compositional ratio of x, y, and z was defined as (x, y, z)=(1, 0.25, 1.75). In other words, ferrite $MnSi_{0.25}Fe_{1.75}O_4$ was created as sample (b).

First, 5.1 (g) of MnO, 1.1 (g) of $SiO_2$, and 10 (g) of $Fe_2O_3$ were prepared as the starting materials of sample (b). These starting materials were mixed, pure water was added to the mixture, and mixed dispersion was performed using a rotating ball mill. In addition, calcination was carried out and crystallized sample (b) was gained.

Example 2

The ferrite $Mn_xSi_yFe_zO_{4-\delta}$ shown in sample (c) in FIG. 2 was created as example 2. In sample (c), the compositional ratio of x, y, and z was defined as (x, y, z)=(1, 0.5, 1.5). In other words, ferrite $MnSi_{0.5}Fe_{1.5}O_4$ was created as sample (c).

First, 5.9 (g) of MnO, 2.5 (g) of $SiO_2$, and 10 (g) of $Fe_2O_3$ were prepared as the starting materials of sample (c). These starting materials were mixed, pure water was added to the mixture, and mixed dispersion was performed using a rotating ball mill. In addition, calcination was carried out and crystallized sample (c) was gained.

Example 3

The ferrite $Mn_xSi_yFe_zO_{4-\delta}$ shown in sample (d) in FIG. 2 was created as example 3. In sample (d), the compositional ratio of x, y, and z was defined as (x, y, z)=(1, 0.75, 1.25). In other words, ferrite $MnSi_{0.75}Fe_{1.25}O_4$ was created as sample (d).

First, 7.1 (g) of MnO, 4.5 (g) of $SiO_2$, and 10 (g) of $Fe_2O_3$ were prepared as the starting materials of sample (d). These starting materials were mixed, pure water was added to the mixture, and mixed dispersion was performed using a rotating ball mill. In addition, calcination was carried out and crystallized sample (d) was gained.
[Comparison 1]

The ferrite $Mn_xSi_yFe_zO_{4-\delta}$ shown in sample (a) in FIG. 2 was created as comparison 1. In sample (a), the compositional ratio of x, y, and z is defined as (x, y, z)=(0, 1, 2). In other words, ferrite $Fe_2SiO_4$ which has conventionally been used was created as sample (a). Note that ferrite $Fe_2SiO_4$ is a nonmagnetic body.

First, 3.8 (g) of $SiO_2$ and 10 (g) of $Fe_2O_3$ were prepared as the starting materials of sample (a). These starting materials were mixed, pure water was added to the mixture, and mixed dispersion was performed using a rotating ball mill. In addition, calcination was carried out and crystallized sample (a) was gained.
[Comparison 2]

The ferrite $Mn_xSi_yFe_zO_{4-\delta}$ shown in sample (e) in FIG. 2 was created as comparison 2. In sample (e), the compositional ratio of x, y, and z was defined as (x, y, z)=(1, 0, 2). In other words, ferrite $MnFe_2O_4$ was created as sample (e). Note that the ferrite $MnFe_2O_4$ is a well-known magnetic body, and was created for the comparison with the ferrite $Mn_xSi_yFe_zO_{4-\delta}$ according to this embodiment.

First, 4.4 (g) of MnO and 10 (g) of $Fe_2O_3$ were prepared as the starting materials of sample (e). These starting materials were mixed, pure water was added to the mixture, and mixed dispersion was performed using a rotating ball mill. In addition, calcination was carried out and crystallized sample (e) was gained.

The following is the evaluation on the crystal structure and magnetic properties of the above-described samples (a) through (e).

3-2. Evaluation on Crystal Structure of Ferrite $Mn_xSi_yFe_zO_{4-\delta}$

The evaluation on the crystal structures of the above-described samples (a) through (e) was firstly conducted. More specifically, the evaluation on the crystal structures was conducted through the measurement of x-ray diffraction patterns. FIG. 3 illustrates the x-ray diffraction patterns (XRD patterns) of samples (a) through (e) shown in the above-described examples 1 through 5 and sample (f).

Note that sample (f) is, although not shown in FIG. 2, a sample in the case where the compositional ratio of x, y, and z in the ferrite $Mn_xSi_yFe_zO_{4-\delta}$ is (x, y, z)=(0.75, 0.25, 2).

Sample (f) is an example in the case where the compositional ratio of x takes a value other than 1 in the ferrite $Mn_xSi_yFe_zO_{4-\delta}$.

The ferrite $Fe_2SiO_4$ shown as sample (a) is known to have an olivine structure. Note that the XRD pattern of ferrite $Fe_2SiO_4$ shown in (a) in FIG. 3 indicates that $Fe_2SiO_4$ has an olivine structure.

Moreover, the ferrite $MnFe_2O_4$ shown as sample (e) is known to have a spinel structure.

Furthermore, a peak pattern that corresponds to the peak pattern in the x-ray diffraction pattern of a spinel structure was observed in samples (b) through (d) and sample (f), as illustrated in FIG. 3. Accordingly, it is verified that the ferrite $Mn_xSi_yFe_zO_{4-\delta}$ having a single phase spinel structure had been generated also in samples (b) through (d) and sample (f).

3-3. Evaluation on Magnetic Properties of Ferrite $Mn_xSi_yFe_zO_{4-\delta}$

Subsequently, the evaluation on the magnetic properties of the above-described samples (a) through (e) was conducted. More specifically, the evaluation on the magnetic properties of ferrites was conducted through the measurement of mass magnetization of samples (a) through (e). FIG. 4 illustrates the magnetic properties (ferromagnetic properties) of samples (a) through (f) shown in the above-described examples 1 through 5.

Note that mass magnetization $\sigma_s$ (emu/g) is magnetic moment (emu) per unit mass. Mass magnetization is a parameter that indicates the intensity of magnetization.

The measurement of mass magnetization was conducted under the magnetic environment where the intensity of magnetization is 3 (kOe). As illustrated in FIG. 4, mass magnetization $\sigma_s$ of samples (a) through (e) was gained as 0.5 (emu/g), 66 (emu/g), 55 (emu/g), 44 (emu/g), and 78 (emu/g), respectively.

Here, as can be seen in the comparison between samples (a) and (d) shown in FIG. 4, the mass magnetization of the composition that includes Mn (sample (d)) was greater than that of the composition that does not include Mn (sample (a)) in the ferrite $Mn_xSi_yFe_zO_{4-\delta}$. In particular, when the compositional ratio of Mn, Si, and Fe was changed from (x, y, z)=(1, 1, 1) to (x, y, z)=(1, 0.75, 0.25), mass magnetization $\sigma_s$ was rapidly changed from 0.5 (emu/g) in sample (a) to 44 (emu/g) in sample (d). Based on this, it is conceivable that mass magnetization $\sigma_s$ (emu/g) of the ferrite $Mn_xSi_yFe_zO_{4-\delta}$ satisfies $\sigma_s \geq 40$ even though some measurement errors are more or less taken into account.

Moreover, in sample (f) which is an example in the case where the compositional ratio of x takes a value other than 1, 79 (emu/g) was gained as mass magnetization $\sigma_s$.

Moreover, as can be seen in the comparison among samples (b) through (e) illustrated in FIG. 4, when the compositional ratio x of Mn was constant, mass magnetization increased at approximately constant ratio as the compositional ratio y of Si decreased and the compositional ratio z of Fe increased. Moreover, in the case of the composition in which Si was completely replaced by Mn (i.e., (x, y, z)=(1, 0, 2)), mass magnetization was the greatest and 78 (emu/g) was gained. Furthermore, in the case where the composition in which the compositional ratio of Si is the greatest ((x, y, z)=(1, 0.75, 1.25)), the smallest value was gained as mass magnetization $\sigma_s$, as shown in sample (d). Based on this, it is conceivable that the value of y needs to satisfy $0<y\leq0.8$ in the ferrite $Mn_xSi_yFe_zO_{4-\delta}$ even though errors in the compositional ratios are taken into account.

4. Advantageous Effects Etc.

As has been described above, the ferrite material according to this embodiment is ferromagnetic and is expressed by a chemical formula $Mn_xSi_yFe_zO_{4-\delta}$, where $0<x<1$, $y>0$, $z>0$, $x+y+z=3$, and $\delta\leq0.5$.

According to this feature, ferrite $Mn_xSi_yFe_zO_{4-\delta}$ which is a composition obtained by adding Mn to ferrite $Fe_2SiO_4$ is ferrite having a new composition that is ferromagnetic. Accordingly, it is possible to form a magnetic core etc. with high magnetic permeability, using the ferrite material according to this embodiment which is a magnetic material having high magnetic properties.

Moreover, in the ferrite $Mn_xSi_yFe_zO_{4-\delta}$, y may satisfy $0<y\leq0.8$.

With this feature, it is possible to provide ferrite $Mn_xSi_yFe_zO_{4-\delta}$ which is a magnetic material having high magnetic properties.

Furthermore, the ferrite material may have mass magnetization $\sigma_s$ (emu/g), where $\sigma_s\geq40$.

With this feature, it is possible to provide ferrite $Mn_xSi_yFe_zO_{4-\delta}$ which is a magnetic material having high magnetic properties and mass magnetization $\sigma_s$ that is greater than or equal to 40 (emu/g).

Embodiment 2

Next, Embodiment 2 will be described. This embodiment describes a composite magnetic body including the ferrite $Mn_xSi_yFe_zO_{4-\delta}$ described in Embodiment 1 and a method of manufacturing the composite magnetic material. FIG. 5 is a schematic diagram illustrating an example of the configuration of composite magnetic body 10 according to this embodiment.

Composite magnetic body 10 according to this embodiment includes ferrite 1 expressed by the above-described chemical formula $Mn_xSi_yFe_zO_{4-\delta}$, and metallic powder 5, as illustrated in FIG. 5. More specifically, composite magnetic body 10 has a structure in which ferrite 1 is packed around metallic powder 5.

Metallic powder 5 may be, for example, FeSiAl or a material obtained by adding Si to Fe-based metallic powder.

Ferrite 1 is the above-described ferrite $Mn_xSi_yFe_zO_{4-\delta}$ and includes Si as does metallic powder 5. Since both ferrite 1 and metallic powder 5 include Si, it is conceivable that a film composed of $SiO_2$ formed around metallic powder 5 and ferrite 1 can be easily blended together through sintering. Accordingly, it is possible to provide composite magnetic body 10 which has increased magnetic permeability and a high degree of adhesion with metallic powder 5 and ferrite 1.

According to composite magnetic body 10 as such, since ferrite 1 which is a ferromagnetic body is packed around metallic powder 5, it is possible to provide composite magnetic body 10 having high magnetic permeability.

Note that composite magnetic body 10 illustrated in FIG. 5 has, for example, a hexagonal close-packed structure in which metallic powder 5 is most closely packed, but composite magnetic body 10 shall not be restricted to the structure in which metallic powder 5 is disposed in a regular manner and may have a structure in which metallic powder 5 is disposed at random.

Figure 6:
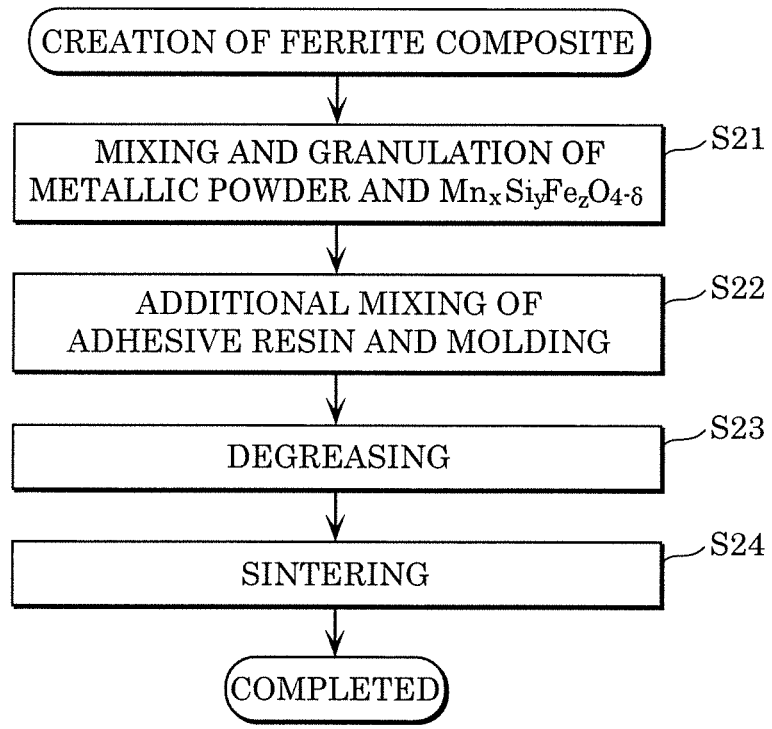
FIG. 6 is a flowchart illustrating a process of manufacturing the composite magnetic body according to Embodiment 2.

FIG. 6 is a flowchart illustrating a process of manufacturing composite magnetic body 10 according to this embodiment.

As illustrated in FIG. 6, first, metallic powder 5 and ferrite 1 are mixed and granulated (Step S21) in the process of manufacturing composite magnetic body 10 according to this embodiment. Next, an adhesive resin is additionally mixed with the mixture of metallic powder 5 and ferrite 1. After that, the material obtained by mixing metallic powder 5, ferrite 1, and the adhesive resin is molded (Step S22). Furthermore, degreasing is carried out for removing the adhesive resin (Step S23). Subsequently, the mixture after the degreasing is sintered (Step S24). With the above-described process, composite magnetic body 10 according to this embodiment can be gained.

The detailed manufacturing method is as follows.

Fe-5Si, for example, was used as metallic powder 5 in the process of mixing and granulating metallic powder 5 and ferrite 1. The above-described ferrite $Mn_xSi_yFe_zO_{4-\delta}$ was used as ferrite 1. The mixing rate between ferrite 1 and metallic powder 5 was defined, for example, as follows: when the weight of metallic powder 5 was defined to be 100 (wt %), the weight of ferrite 1 was defined to be 5 (wt %) of the weight of metallic powder 5. Note that the material of metallic powder 5 may be FeSiAl, a material obtained by adding Si to Fe-based metallic powder, a mixture of these materials, etc.

Next, an adhesive resin was additionally mixed with the mixture of metallic powder 5 and ferrite 1. A butyral resin, for example, was used as the adhesive resin. Moreover, an organic solvent was further mixed with the mixture obtained by mixing metallic powder 5, ferrite 1, and the butyral resin, and mixed dispersion was performed using a rotating ball mill.

Next, the above-described mixture was pressure-molded with the pressure of 784 (MPa), and a molded body having a predetermined shape was created. This molded body was heated with the temperature of approximately 200 to 400 (° C.) and degreasing was carried out. With this, the butyral resin which is an adhesive resin was removed and a molded body in which metallic powder 5 had been packed around ferrite 1 was gained.

Moreover, the molded body was sintered in an electric furnace. The sintering was performed, for example, through five-hours heating in $N_2$ atmosphere with the temperature of 1000 (° C.). With this, a sintered composite magnetic body was gained. Note that the temperature of sintering may be 1000 to 1200 (° C.).

Note that sintering may be performed using discharge plasma instead of an electric furnace. The sintering temperature in this case may be, for example, at 800 to 1000 (° C.). By using discharge plasma, it is possible to perform sintering with the temperature lower than the temperature required in the case of sintering using an electric furnace.

As has been described above, with the composite magnetic body according to this embodiment, it is possible to provide a composite magnetic body having high magnetic permeability. Therefore, by using the composite magnetic body according to this embodiment, it is possible to form a magnetic core etc. having high magnetic permeability.

Variations Etc.

Although the ferrite and the composite magnetic body according to the embodiments of the present disclosure have been described so far, the present disclosure shall not be limited to the aforementioned embodiments.

For example, a coil component including the above-described composite magnetic body is also included in the present disclosure. A high-frequency inductor and transformer can be raised as the examples of the coil component. In addition, a power supply device including the above-described coil component is also included in the present disclosure.

Moreover, the combinations of the compositional ratio of x, y, and z for Mn, Si, and Fe in the ferrite $Mn_xSi_yFe_zO_{4-\delta}$ shall not be restricted to the above-described combinations, and may be changed accordingly.

Moreover, the mixing method of mixing $MnO$, $SiO_2$, and $Fe_2O_3$ as well as that of mixing metallic powder, ferrite, butyral resin, and an organic solvent shall not be restricted to the aforementioned mixed dispersion using a rotating ball mill, and a different mixing method may be used instead.

What is more, the methods of calcination and sintering shall not be restricted to the above-described methods, and a different method such as a hot press method may be used instead. Furthermore, the pressure, temperature, and time used in each of the above-described steps are mere examples and different pressure, temperature, and time may be employed instead.

The present disclosure shall not be restricted to these embodiments. Forms obtained by various modifications to the foregoing embodiment that can be conceived by a person skilled in the art as well as forms realized by arbitrarily combining components and functions in the embodiment within the scope of the essence of the present disclosure are included in the present disclosure.

INDUSTRIAL APPLICABILITY

The magnetic material according to the present disclosure is applicable to the materials for the magnetic cores of high-frequency inductors and transformers etc.

The invention claimed is:

1. A ferrite that is ferromagnetic and is expressed by a chemical formula $Mn_xSi_yFe_zO_{4-\delta}$,
wherein $0<x<1$, $0.25\leq y\leq 0.75$, $z>0$, $x+y+z=3$, and $\delta\leq 0.5$.

2. The ferrite according to claim 1, wherein $0.75\leq x<1$, $0.25\leq y\leq 0.75$, $1.25\leq z\leq 2$, $x+y+z=3$, and $\delta\leq 0.5$.

3. The ferrite according to claim 1, wherein $0<x<1$, $0.25\leq y\leq 0.75$, $0<z\leq 2$, $x+y+z=3$, and $\delta\leq 0.5$.

4. A composite magnetic body, comprising:
the ferrite according to claim 1; and
metallic powder.

5. A coil component, comprising:
the composite magnetic body according to claim 4.

6. A power supply device, comprising:
the coil component according to claim 5.

7. The composite magnetic body according to claim 4, wherein
the ferrite material has mass magnetization $\sigma_s$ (emu/g), where $\sigma_s\geq 40$.

8. A composite magnetic body, comprising:
the ferrite according to claim 2; and
metallic powder.

9. A coil component, comprising:
the composite magnetic body according to claim 8.

10. A power supply device, comprising:
the coil component according to claim 9.

11. The composite magnetic body according to claim 8, wherein
the ferrite material has mass magnetization $\sigma_s$ (emu/g), where $\sigma_s\geq 40$.

12. A composite magnetic body, comprising:
the ferrite according to claim 3; and
metallic powder.

13. A coil component, comprising:
the composite magnetic body according to claim 12.

14. A power supply device, comprising:
the coil component according to claim 13.

15. The composite magnetic body according to claim 12, wherein
the ferrite material has mass magnetization $\sigma_s$ (emu/g), where $\sigma_s\geq 40$.

16. The ferrite according to claim 1, wherein the ferrite has mass magnetization $\sigma_s$ (emu/g), where $\sigma_s\geq 40$.

17. The ferrite according to claim 2, wherein the ferrite has mass magnetization $\sigma_s$ (emu/g), where $\sigma_s\geq 40$.

18. The ferrite according to claim 3, wherein the ferrite has mass magnetization $\sigma_s$ (emu/g), where $\sigma_s\geq 40$.

* * * * *